(12) United States Patent
Bommi et al.

(10) Patent No.: US 7,585,409 B2
(45) Date of Patent: Sep. 8, 2009

(54) MULTI-STAGE WATER PURIFICATION DEVICE

(75) Inventors: Govind Bommi, Bayshore Park (SG); Krishna Murthy Bommi, Bangalore (IN)

(73) Assignee: Filtrex Holdings Pte, Parklane Mall (SG)

( * ) Notice: Subject to any disclaimer, the term of this patent is extended or adjusted under 35 U.S.C. 154(b) by 803 days.

(21) Appl. No.: 11/163,953

(22) Filed: Nov. 4, 2005

(65) Prior Publication Data

US 2007/0102332 A1 May 10, 2007

(51) Int. Cl.
*C02F 1/28* (2006.01)

(52) U.S. Cl. .................. 210/120; 210/136; 210/198.1; 210/295; 210/282; 210/502.1; 222/189.08

(58) Field of Classification Search ................. 210/120, 210/136, 282, 198.1, 502.1, 295; 222/189.08
See application file for complete search history.

(56) References Cited

U.S. PATENT DOCUMENTS

| | | | |
|---|---|---|---|
| 4,298,475 A | 11/1981 | Gartner | |
| 4,798,671 A | 1/1989 | Mijers et al. | |
| 4,995,976 A | 2/1991 | Vermes et al. | |
| 5,045,195 A | 9/1991 | Spangrud et al. | |
| 5,156,335 A | 10/1992 | Smith et al. | |
| 5,167,819 A | 12/1992 | Iana et al. | |
| 5,273,649 A | 12/1993 | Magnusson et al. | |
| 5,431,813 A | 7/1995 | Daniels | |
| 5,509,605 A | 4/1996 | Cripe | |
| 5,518,613 A | 5/1996 | Koczur et al. | |
| 5,545,315 A | 8/1996 | Looneman | |
| 5,609,759 A | 3/1997 | Norhren, Jr. et al. | |
| 5,688,397 A | 11/1997 | Malmborg | |
| 5,919,365 A | 7/1999 | Collette | |
| 5,928,512 A | 7/1999 | Hatch et al. | |
| 6,004,460 A | 12/1999 | Palmer et al. | |
| 6,395,170 B1 * | 5/2002 | Hughes et al. | ............... 210/232 |
| 6,569,329 B1 | 5/2003 | Norhren, Jr. | |
| 6,733,669 B1 | 5/2004 | Crick | |

FOREIGN PATENT DOCUMENTS

| | | |
|---|---|---|
| WO | WO 00/09448 | 2/2000 |
| WO | WO 01/09040 | 2/2001 |
| WO | WO 2005/075356 | 8/2005 |

* cited by examiner

*Primary Examiner*—Terry K Cecil
(74) *Attorney, Agent, or Firm*—Levenfeld Pearlstein, LLC

(57) ABSTRACT

A multi-stage water purification device includes an untreated water compartment having an untreated water inlet and a treated water compartment formed from a resilient material. The compartments are segregated from one another. An outlet is in flow communication with the treated water compartment. A first unidirectional valve is disposed between the treated water compartment and the outlet and is configure to permit flow out of the treated water compartment only. A filter is disposed between the untreated water compartment and the treated water compartment. The untreated water flows through the filter to produce treated water. A second unidirectional flow valve is positioned at the discharge of the filter and is configured to permit flow out of the filter and into the treated water compartment only. Water is introduced into the untreated water compartment and the treated water compartment is deformed to reduce the volume therein. As the treated water compartment returns to its initial volume it provides a negative pressure to draw the water through the filter into the treated water compartment.

12 Claims, 2 Drawing Sheets

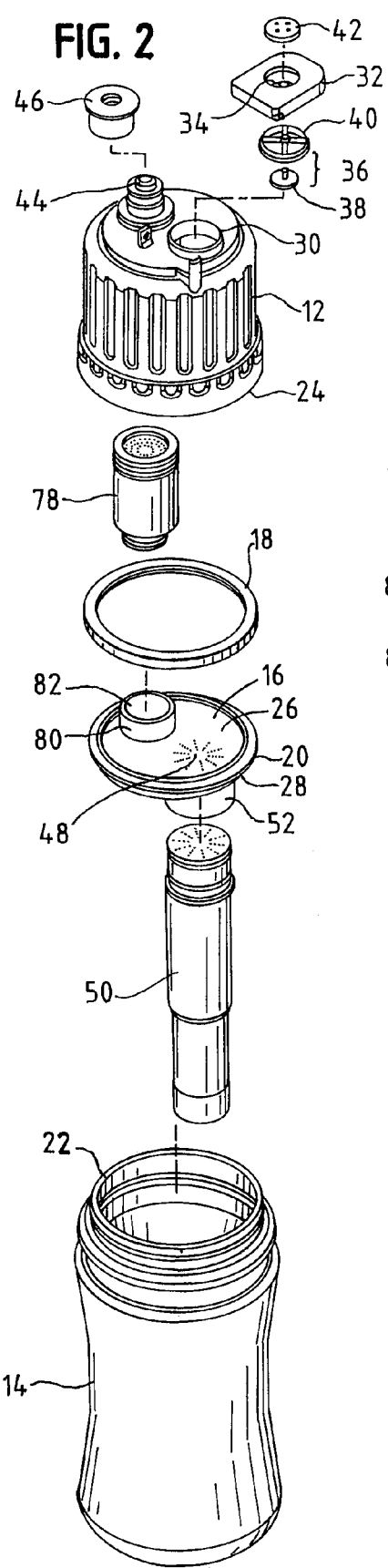
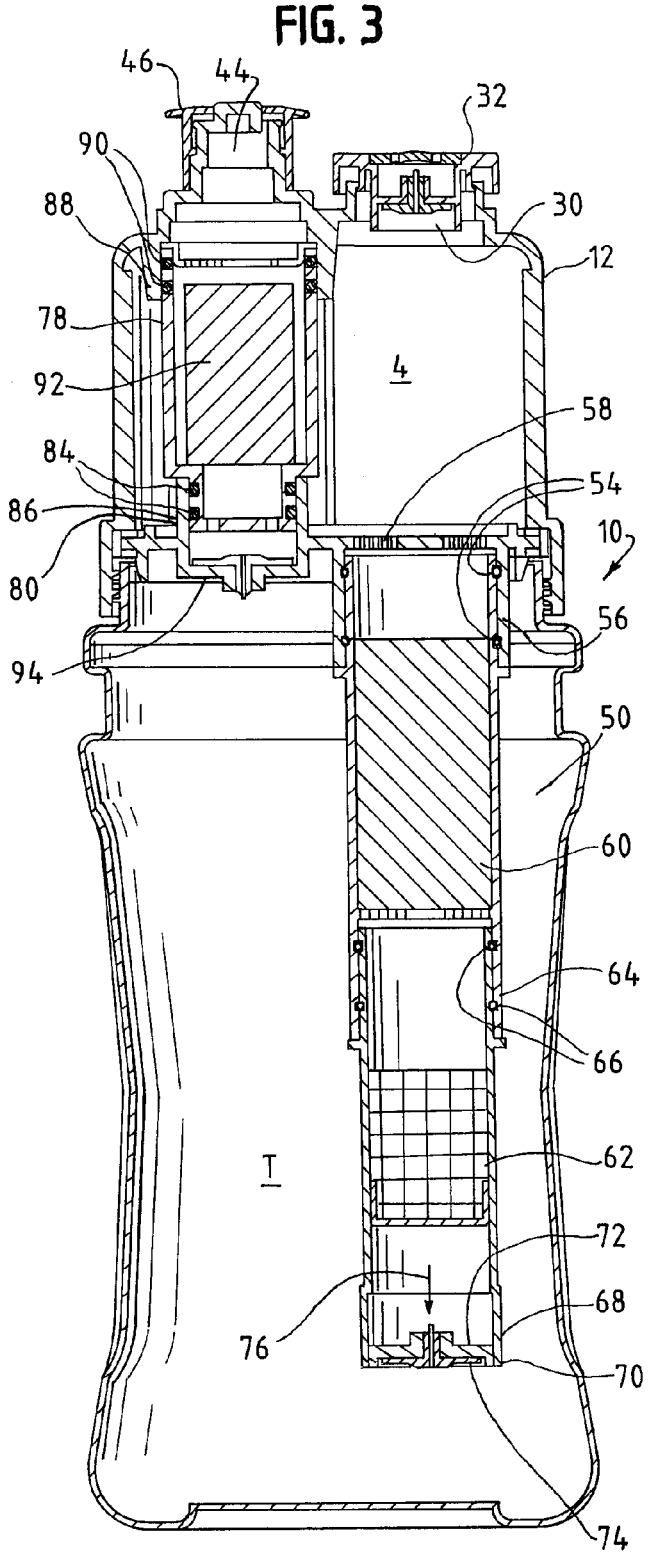

MULTI-STAGE WATER PURIFICATION DEVICE

BACKGROUND OF THE INVENTION

The present invention is directed to a water filtration system. More particularly, the present invention is directed to a portable water filtration system in which unfiltered and filtered water are stored in chambers separated from one another and in which water flows through a filter having a unidirectional valve that permits flow only from the unfiltered chamber to the filtered chamber.

Filtering and purifying water to make it suitable for drinking have been an on-going challenge throughout the world, particularly in developing countries. Sources of drinking water can be naturally contaminated, as by biological impurities, and/or contaminated by chemical and other non-naturally occurring sources.

Large scale, e.g., land-based purification systems have been developed to address the problem of contaminated water supply. However, access to water thus purified is not always available. To meet the needs of traveling public, several portable water filters and purifiers have been developed. Some of these portable water filters and purifiers are disposed in sports bottles that allow a user to obtain clean drinking water "on the go".

Several portable water filters and purifiers have been introduced that rely on pressure differential, as developed by suction from the mouth piece and or pressure on the bottle (e.g., squeezing the bottle) for water flow. Other portable systems rely on a straw-like mouth piece through which the water must be drawn. In both of these systems, water is purified as it flows from the container bottom to the top. One principle drawback to these purifiers is that the user must exert a large force (as by sucking action) to draw the water through the purifier. Other portable water purifiers rely on filters and purifiers configured as cartridges that are mounted in the cap of a sports bottle.

In all these systems water is purified as it flows through the cartridge. Granular activated carbon and carbon blocks (with iodinated resin) formed as cartridges that attach bottle caps are also known in the art. In most of these systems, a full squeeze of the container is required to force water to flow through the cartridge. Releasing the pressure from the squeezing action reduces the pressure in the container which can cause water in the cartridge to flow back into the container.

Still another system is a three stage portable water purifier system. Water is purified as it flows from bottom of the container to the top of the container. Although this system functions well, it has a major limitation in that the bottle must be kept in a vertical position while in use. This may be contrary to normal use, in which a user would typically tilt the bottle to obtain a drink.

Yet another system includes a water filter bottle in which the receiving chamber is double walled to separate the inlet and outlet of water. Water to be purified flows by gravity through the filter. However, flow through the filter relies on gravity and is thus quite slow.

Accordingly, there is a need for a multistage water purification device. Desirably, such a device maintains the filtered and unfiltered water separated from one another. More desirably, such a device is configured to induce water flow by manually squeezing a receiving compartment forcing air from the compartment and creating a driving force through lower pressure for water flow for purification.

BRIEF SUMMARY OF THE INVENTION

A multi-stage water purification device includes an untreated water compartment having an untreated water inlet and a treated water compartment segregated from the untreated water compartment. The treated water compartment has an initial volume and is formed from a squeezable, resilient material. An outlet is positioned in the untreated water compartment and is in flow communication with the treated water compartment.

A first unidirectional valve is disposed between the treated water compartment and the outlet. The valve is configured to permit flow out of the treated water compartment only.

A filter is disposed between the untreated water compartment and the treated water compartment. The untreated water flows through the filter to produce treated water. The filter has a second unidirectional flow valve at the discharge that is configured to permit flow out of the filter and into the treated water compartment only.

Water is introduced into the untreated water compartment. The treated water compartment is deformed (squeezed) to reduce its volume therein. As the compartment is let go, it returns its initial volume which provides a negative pressure to draw the water through the filter into the treated water compartment. The untreated water compartment can include an air inlet in communication with the environs. The air inlet is configured as a unidirectional valve to permit air flow into the untreated water compartment and to prevent flow out of the untreated water compartment.

In a present device, the filter is a cartridge filter. The filter is preferably a carbon-based filter. It can include granulated carbon and/or activated carbon.

Most preferably, the filter is a multi-stage filter and includes a carbon-based stage and a disinfectant based stage.

The water purification device can also include a final stage chamber disposed between the first unidirectional valve and the outlet. Such a final stage chamber is disposed in the untreated water compartment and is configured to maintain the untreated water isolated from the treated water, by providing a closed flow path from the treated water compartment to the treated water outlet.

The final stage chamber can include a further filtering element. The final stage chamber can also include a cartridge having flavor enhancers, vitamins, minerals, food supplements or medications for aqueous dispensing.

A disposable, multi-stage cartridge filter and finishing filter are also disclosed.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein:

FIG. 2 is an exploded view of the water purification device; and

FIG. 3 is a cross-sectional view taken along line 3-3 of FIG. 1.

DETAILED DESCRIPTION OF THE INVENTION

Figure 1:
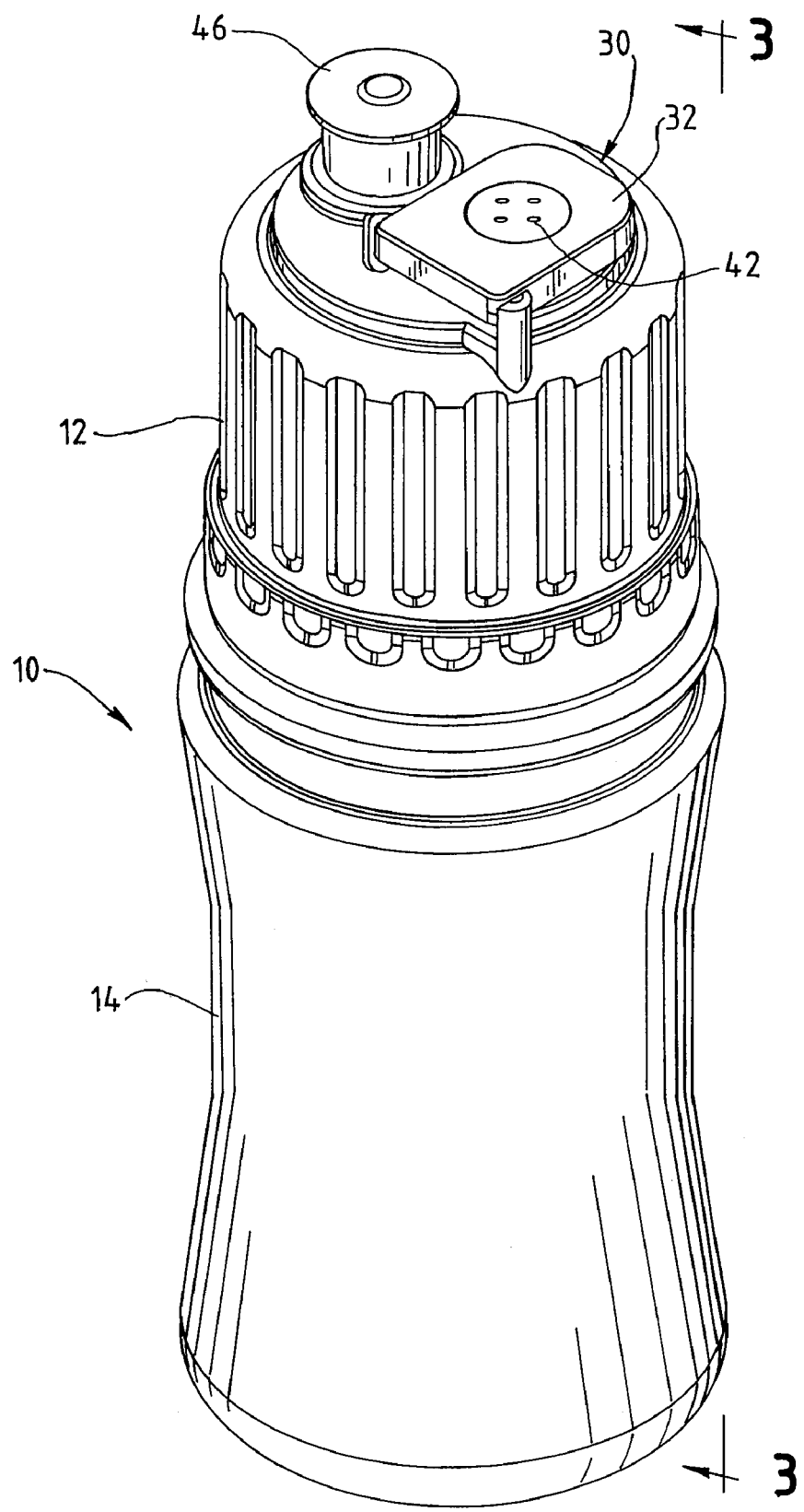
FIG. 1 is a perspective view of a multi-stage water purification device in accordance with the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

Referring now to the figures, and in particular to FIG. 1 there is shown a multi-stage water purification device 10 in accordance with the principles of the present invention. The device 10 includes an upper compartment 12 and a lower compartment 14 separated from one another by a center or separator plate 16. As is readily appreciated, the device 10 is formed as a bottle, such as a sports or squeeze bottle and the upper compartment 12 is defined by a cap-like member. A seal 18, such as a rubber or like resilient washer is positioned over the edge 20 of the plate 16 and resides between the upper and lower compartments 12, 14.

The lower compartment 14 is formed from a resilient polymeric material that has good recovery to its original shape when deformed with light pressure, such as, for example, that generated by a manual squeeze. Suitable materials for the lower compartment 14 include, but are not limited to polyethylene terephthalate (PET), high density polyethylene (HDPE), low density polyethylene (LDPE) and the like. The upper compartment 12 can be made of a wide variety of materials, such as a rigid plastic including acrylonitrile butadiene styrene (ABS), polycarbonate (PC), polypropylene (PP) and the like. In a present embodiment, the lower compartment 14 has a capacity of about 0.5 liters (about 16 fluid ounces) and the upper compartment 12 has capacity of about 50 ml (about 1.6 fluid ounces).

The lower compartment 14 has an external thread 22 that mates with an internal thread 24 formed in the upper cap 12. The separator plate 16 is disposed between the compartments 12, 14. The seal 18 has a C-shape and is positioned on the edge 20 of the plate 16, extending over the upper and lower plate surfaces 26, 28, respectively, adjacent to the edge 20. The plate 16 and seal 20 assembly is positioned between the upper and lower 12, 14 compartments as they are threaded together, to seal or isolate the compartments from one another.

The upper compartment 12 has a water inlet 30. A cover 32 resides on the inlet 30 to provide a closure for the inlet 30. The cover 32 has an opening 34 therein, in which is positioned a unidirectional valve assembly 36. The cover 32 can be hinged to facilitate filling the upper compartment 12 and to retain the cover 32 mounted to the device 10. The assembly 36 includes a valve element 38, a housing 40 and an air inlet cover 42 that is positioned over the valve 38 and housing 40. As will be described below, the valve 36 permits air to flow into the upper compartment 12 from the outside environment during use, but prevents flow out of the upper compartment 12.

The upper compartment 12 also includes an outlet or discharge 44. In a present embodiment, the outlet 44 is configured as a pull-up valve 46 commonly used on water bottles, juice bottles and the like. These pull-up valves 46 are commonly referred to as sport caps.

The separator plate 16 includes a first opening 48 for mounting a purifier cartridge 50 thereto. The cartridge 50 is mounted to the plate 16 and extends into the lower compartment 14. In a present device, a sleeve 52 extends outwardly from the plate 16 into which the cartridge 50 is inserted. One or more serially arranged seals 54 (such as the illustrated O-rings) can be used to form a seal at the cartridge/sleeve juncture 56.

The purifier cartridge 50 has a plurality of elements that serve to perform different functions in a multi-stage filtration or purification scheme. The cartridge 50 is effectively formed from a particulate filter 58, a carbon chamber 60 and a disinfectant chamber 62. The chambers 60, 62 are fitted at their ends into one another and are sealed at their juncture 64, using a pair of serially arranged seals 66 (such as the illustrated O-rings).

At the inlet to the carbon chamber 60 (at the upper compartment 12), the particulate filter 58, which is formed as a mesh screen, is positioned to trap suspended particulate matter, impurities, contaminants and the like. The carbon filter 60 is disposed downstream of the screen 58. Suitable carbon filters include granulated carbon filters, granulated activated carbon (GAC) filters, monolithic carbon block filters and the like. Those skilled in the art will recognize that granulated carbon filters are commonly used to remove odors, harmful organics compounds and certain heavy metals. It will also be appreciated that GAC filters are non-polar in nature, so they have the greatest affinity for other non-polar substances and as a result are most effective in the removal of a variety of organic contaminates, including trihalomethanes, pesticides, herbicides and polyaromatic hydrocarbons. GAC filters can be used in conjunction with ion exchange resins to remove harmful heavy metals.

The monolithic carbon block filters can designed such that the porosity of the block is as low as 1 micron to trap biological contaminates such *Giardia lamblia* and *Cryptosporidium parvum*. Such a carbon block can optionally include additives, such as specific zeolite compounds, for example, ATS (commercially available from Engelhard Corporation of Iselin, N.J.), for lead reduction, as well as silver additives to make the blocks biostatic. The various constituents, constructions and additives for the carbon chamber will be appreciated by those skilled in the art and are within the scope and spirit of the present invention.

The disinfecting chamber 62 houses any known disinfectant that is capable of removing bacteria and viral contaminants contained in the water. For example, halogenated resins such as tri-iodine or penta-iodine resins can be used in this stage. Chlorinate or brominates beads (such as those commercially available from Vanson HaloSource of Redmond, Wash.) can also be used. This stage can also house microfiltration elements, such as membranes, hollow fibers and the like. The type of disinfection that can be carried out is not limited to the above mentioned disinfectants; rather it can include any desired disinfection program.

It also will be understood that the multi stage purifier cartridge 50 is not limited to a certain number of stages. The number of stages will vary depending upon the level of purification desired.

The bottom 68 of the disinfection chamber 62 includes a unidirectional valve assembly 70. The assembly 70 includes a valve body 72 and a valve element 74. The body 72 secures the valve body 74 to the discharge end 68 of the purifier cartridge 50. The valve 70 allows flow only in the discharge direction (as indicated by the arrow at 76), that is, only from the upper compartment 12 into the lower compartment 14, and prevent reverse flow from the lower compartment 14 into the upper compartment 12.

A final stage purifier chamber 78 is likewise mounted to the separator plate 16 at a sleeve 80 surrounding a second plate opening 82. The final stage purifier 78 extends into the upper compartment 12. Here too, one or more serially arranged seals 84 (such as the illustrated O-rings) can be used to form a seal at the final stage/sleeve juncture 86. The final stage purifier chamber 78 is likewise mounted to the cap (upper compartment 12) at the outlet or discharge 44 (at about a sleeve 88) using one or more serially arranged seals 90. In this manner, the flow path from the lower compartment 14, though the final stage purifier chamber 78 and out through the outlet 44 is closed, or completely isolated from the untreated feed or inlet water U that is introduced into the device 10 through the upper compartment water inlet 30.

The final stage purifier chamber 78 includes a cartridge 92 that can be used for a variety of purposes. The cartridge 92 can house water taste enhancers such as liquid flavor extracts and the like. The cartridge 92 can also be used for dispensing vitamins, minerals, medications or the like. It can also be used for final polishing of water alone or in conjunction with any of the above-noted enhancements.

A unidirectional valve 94 is positioned at the bottom of the opening 82 (sleeve 88) to allow flow only in the discharge direction, that is, only from the lower compartment 14, through the final stage chamber 78.

In use, the lower compartment 14 and upper compartment 12 are screwed together tightly with the purifier cartridge 50 and the final stage purifier chamber 78 in place and mounted to the separator plate 16 and the separator plate 16 and outlet sleeve 88, respectively. With the device 10 held upright and the outlet 44 spout open, water to be purified is filled into the upper compartment 12 through the inlet 30. The opening cover 32 is then closed and a gentle squeezing pressure is applied on the lower compartment 14 to reduce the volume of the compartment 14 and thus force the air in the lower compartment 14 out of the compartment 14 through the unidirectional valve 94 at the final stage purifier chamber 78 and through outlet 44.

When the squeeze pressure is released, the compartment 14 tends to return to its original shape, which creates a negative pressure or vacuum in the lower compartment 14. This provides the motive force to drive water in the upper compartment 12 down through the multi stage purifier cartridge 50 into the lower compartment 14 (and thus emptying the upper compartment 12). The displaced water volume in the upper compartment 12 is accommodated by air flow into the upper compartment 12 through the cover air inlet valve 36. With repeated squeezes, the water in the upper compartment 12 flows into the lower compartment 14. The upper compartment 12 can be refilled to complete the process to fill the lower compartment 14. To discharge (e.g., drink) the purified water T collected in the lower compartment 14. The inlet opening cover 32 is closed and the device 10 is tilted, just as any water or sport bottle is used. By keeping the outlet 44 spout opened and gently squeezing the lower compartment 14, water flows through the unidirectional valve 94 into the opening 44 spout. As water flows out of the lower compartment 14 (through the outlet 44), a negative pressure is created in the lower compartment 14. When the pressure due to squeezing the compartment 14 is released, air from outside rushes into the lower compartment 14, again, through the inlet air valve 36 (in the cover 32) and through the filter/purifier 59, into the lower compartment 14. With repeated squeezes water flow continues out of the outlet 44.

All patents referred to herein, are hereby incorporated herein by reference, whether or not specifically done so within the text of this disclosure.

In the present disclosure, the words "a" or "and" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover all such modifications as fall within the scope of the disclosed, exemplary embodiment.

What is claimed is:

1. A multi-stage water purification device, comprising:
   an untreated water compartment, the untreated compartment having an untreated water inlet;
   a treated water compartment, the treated water compartment being segregated from the untreated water compartment, the treated water compartment having an initial volume and being formed from a resilient material;
   an outlet in flow communication with the treated water compartment;
   a first unidirectional valve disposed between the treated water compartment and the outlet, the first unidirectional valve configured to permit flow out of the treated water compartment only; and
   a filter disposed between the untreated water compartment and the treated water compartment, the untreated water flowing through the filter to produce treated water, the filter having a second unidirectional flow valve at a discharge thereof configured to permit flow out of the filter and into the treated water compartment only,
   wherein when water is introduced into the untreated water compartment and the treated water compartment is deformed to reduce the volume therein, the treated water compartment returning to its initial volume provides a negative pressure to draw the water through the filter into the treated water compartment.

2. The water purification device in accordance with claim 1 wherein the untreated water compartment includes an air inlet in communication with the environs, wherein the air inlet is configured as a unidirectional valve to permit air flow into the untreated water compartment and to prevent flow out of the untreated water compartment.

3. The water purification device in accordance with claim 1 wherein the filter is a cartridge filter.

4. The water purification device in accordance with claim 1 wherein the filter is a carbon-based filter.

5. The water purification device in accordance with claim 4 wherein the carbon-based filter is a granulated carbon filter.

6. The water purification device in accordance with claim 4 wherein the carbon-based filter is an activated carbon filter.

7. The water purification device in accordance with claim 1 wherein the filter is a multi-stage filter.

8. The water purification device in accordance with claim 7 including a carbon-based stage and a disinfectant based stage.

9. The water purification device in accordance with claim 1 including a final stage chamber disposed between the first unidirectional valve and the outlet.

10. The water purification device in accordance with claim 9 wherein the final stage chamber is disposed in the untreated water compartment and is configured to maintain the untreated water isolated from the treated water.

11. The water purification device in accordance with claim 9 wherein the final stage chamber includes a further filtering element.

12. The water purification device in accordance with claim 9 wherein the final stage chamber includes a cartridge having flavor enhancers, vitamins, minerals, food supplements or medications for aqueous dispensing.

* * * * *

UNITED STATES PATENT AND TRADEMARK OFFICE
CERTIFICATE OF CORRECTION

PATENT NO. : 7,585,409 B2  Page 1 of 1
APPLICATION NO. : 11/163953
DATED : September 8, 2009
INVENTOR(S) : Bommi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Fourteenth Day of September, 2010

David J. Kappos
*Director of the United States Patent and Trademark Office*